United States Patent [19]

Fujii et al.

[11] Patent Number: 5,759,678
[45] Date of Patent: Jun. 2, 1998

[54] HIGH-STRENGTH POROUS FILM AND PROCESS FOR PRODUCING THE SAME

[75] Inventors: Toshio Fujii; Tatsuya Mochizuki, both of Okayama-ken, Japan

[73] Assignee: Mitsubishi Chemical Corporation, Japan

[21] Appl. No.: 725,652

[22] Filed: Oct. 1, 1996

[30] Foreign Application Priority Data

Oct. 5, 1995 [JP] Japan ..................... 7-258612

[51] Int. Cl.⁶ ............... B29C 47/78; B29C 55/04; B01D 39/00; H01M 2/16
[52] U.S. Cl. .................. 428/315.5; 210/500.27; 210/500.36; 264/41; 264/210.4; 264/210.6; 264/211.19; 264/344; 264/564; 428/220; 428/333; 428/339; 429/249; 429/254; 521/64; 521/143
[58] Field of Search ............. 210/500.27, 500.36; 428/220, 304.4, 315.5, 333, 339; 429/249, 254; 521/62, 64, 143; 264/41, 210.4, 210.6, 211.19, 344, 564

[56] References Cited

U.S. PATENT DOCUMENTS

| | | | |
|---|---|---|---|
| 4,237,083 | 12/1980 | Young et al. | 264/41 |
| 4,588,633 | 5/1986 | Kono et al. | |
| 4,613,441 | 9/1986 | Kohno et al. | |
| 4,731,304 | 3/1988 | Lundquist et al. | 429/62 |
| 4,778,601 | 10/1988 | Lopatin et al. | |
| 4,828,772 | 5/1989 | Lopatin et al. | |
| 4,833,172 | 5/1989 | Schwarz | 264/41 X |
| 4,873,034 | 10/1989 | Kono et al. | 264/41 |
| 5,240,655 | 8/1993 | Troffkin et al. | 264/41 X |

FOREIGN PATENT DOCUMENTS

| | | |
|---|---|---|
| 355 214 | 2/1990 | European Pat. Off. . |
| 547 237 A1 | 6/1993 | European Pat. Off. . |
| 0 603 500 A1 | 6/1994 | European Pat. Off. . |
| 58-59072(A) | 4/1983 | Japan . |
| 59-227420(A) | 12/1984 | Japan . |
| 62-122736(A) | 6/1987 | Japan . |
| 2-30514(A) | 1/1990 | Japan . |
| 2-94356 | 4/1990 | Japan . |
| 2-251545(A) | 10/1990 | Japan . |
| 3-105851(A) | 5/1991 | Japan . |
| 5-9332(A) | 1/1993 | Japan . |
| 5-310989(A) | 11/1993 | Japan . |
| 6-262679(A) | 9/1994 | Japan . |
| 07228718(A) | 8/1995 | Japan . |
| WO 93/01623 | 1/1993 | WIPO . |

OTHER PUBLICATIONS

Database WPI Derwent Publications Ltd., London AN 93-191608[24] & JP-A-5 117 440 May 1993 (Mitsubishi Kasei Corp.) Abstract.

Database WPI Derwent Publications Ltd., London AN 88-107426[16] & JP-A-62 254 806 (Mitsubishi Chem. Ind. KK.) Nov. 1987 Abstract.

Derwent Class A17, XP002045340, AN 93-410978 & JP 05 310 989 Nov. 1993.

Derwent, Class A17, AN 95-057374 XP002045341 & JP 06 336 535 Dec. 1994.

Primary Examiner—Marion E. McCamish
Assistant Examiner—Blaine R. Copenheaver
Attorney, Agent, or Firm—Nixon & Vanderhye

[57] ABSTRACT

The present invention relates to a high-strength porous film or sheet consisting essentially of a high-molecular-weight polyethylene resin having a viscosity-average molecular weight of not less than 300,000, wherein the said film has a thickness of 5 to 50 μm, an air permeability of 200 to 1,000 sec/100 cc, a porosity of 10 to 50% and a pin puncture strength of not less than 600 gf/25 μm, and a process for producing the said film.

16 Claims, No Drawings

HIGH-STRENGTH POROUS FILM AND PROCESS FOR PRODUCING THE SAME

BACKGROUND OF THE INVENTION

The present invention relates to a high-strength porous film useful for a variety of commercial articles or parts thereof such as, typically, battery separator, separating membranes such as a precision filter membrane, clothing articles such as an air-permeable jumper, sanitary articles such as a diaper and sanitary napkin, and the like, and a process for producing such a film. More particularly, the present invention relates to a high-strength porous film having high surface strength and a moderate degree of air permeability, and a process for producing such a film.

The porous films (including sheets) have been widely used for a variety of purposes, and many method for producing such porous films have been proposed. For instance, the porous film used for battery separator is produced generally by once forming a film of a resin composition containing an ultra-high-molecular-weight polyethylene and a plasticizer by melt extrusion molding, and then dissolving away the plasticizer contained in the film with an organic solvent such as isopropanol, ethanol, hexane or the like.

A porous film which is useful for a battery separator with high surface strength, especially excellent pin puncture strength has been proposed (Japanese Patent Application Laid-Open (KOKAI) No. 7-29563).

Further enhancement of strength of these porous films is desired. Specifically, with speed-up of battery manufacture, it is required still more to improve the surface strength of the porous film used for battery separator.

However, by the conventional porous film manufacturing techniques, it was difficult to satisfy such required film strength, and especially, it was impossible to satisfy both requirements for high film surface strength and for a moderate degree of air permeability at the same time. For instance, in case of a film having high surface strength such as 600 gf/25 μm or more of pin puncture strength, the air permeability (sec/cc) of such film increases, such as above 3,000 sec/100 cc and there is a problem that the breathability of the film which is a basic property of porous films is impaired. Reversely, in case of a porous film with high breathability, the surface strength of such film is too poor.

As a results of the present inventors' strenuous studies for obtaining a film with high surface strength and a moderate degree of air permeability, it has been found that by melt-extruding a resin composition containing a high-molecular weight polyethylene resin having a viscosity-average molecular weight of not less than 300,000 and a plasticizer into a film, cooling the extruded film, removing the plasticizer contained in the obtained film and then stretching the resultant film, when the deformation ratio of the machine direction (MD)/transverse direction (TD) being controlled within the range of 0.1 to 1 throughout the production process, the produced film has specifically a high surface strength and a moderate degree of air permeability. The present invention has been attained on the basis of this finding.

SUMMARY OF THE INVENTION

An object of the present invention is to provide a high-strength porous film or sheet having high surface strength, for example, a pin puncture strength of not less than 600 gf/25 μm and a moderate degree of air permeability, for example, an air permeability of 200 to 1000 sec/100 cc, and a process for producing such a high-degree porous film or sheet.

To accomplish the aims, in a first aspect of the present invention, there is provided a high-strength porous film or sheet comprising a high-molecular-weight polyethylene resin having a viscosity-average molecular weight of not less than 300,000, and having a thickness of 5–50 μm, an air permeability of 200–1,000 sec/100 cc, a porosity of 10–50% and a pin puncture strength of not less than 600 gf/25 μm of the film thickness.

In a second aspect of the present invention, there is provided a process for producing a high-strength porous film or sheet comprising melt-extruding and molding a resin composition containing a high-molecular-weight polyethylene having a viscosity-average molecular weight of not less than 300,000 and a plasticizer, cooling the extruded film or sheet, removing the plasticizer contained in the said film or sheet, and stretching the said resultant film or sheet, wherein the said extrusion molding and stretching are carried out in such a manner that the machine direction (MD)/transverse direction (TD) overall deformation ratio represented by the following formula is 0.1 to 1:

$$\text{MD/TD overall deformation ratio} = (DR \times \lambda MD)/(WD \times \lambda TD)$$

wherein

DR: draft ratio in extrusion molding;

λMD: stretch ratio in the machine direction (which ratio is supposed to be 1 when the film or sheet is not stretched in the machine direction);

WD: width-direction deformation ratio in extrusion molding (blow ratio in the case of inflation molding);

λTD: stretch ratio in the transverse direction (which ratio is supposed to be 1 when the film or sheet is not stretched in the transverse direction).

DETAILED DESCRIPTION OF THE INVENTION

The present invention is described in detail below. The term "film" used in the present invention, means both film and sheet.

The high-molecular-weight polyethylene resin constituting the film according to the present invention has a viscosity-average molecular weight of not less than 300,000, preferably 500,000 to 4,000,000, more preferably 1,500,000 to 3,000,000. As such high-molecular weight polyethylene, there is preferably used an ethylene homopolymer having a melting temperature of 110°–140° C. because of readiness for melt deformation.

In the present invention, if necessary, it is possible to blend polybutene-1, polypropylene or a polyethylene having a viscosity-average molecular weight of less than 300,000 in an amount of 100 parts by weight or less, preferably 2–80 parts by weight base on 100 parts by weight of the high-molecular weight polyethylene having a viscosity average molecular weight of not less than 300,000 used in the present invention. Examples of the polyethylenes having a viscosity-average molecular weight of less than 300,000, which are usable in the present invention, include linear or branched low-density polyethylenes (5,000–100,000 in viscosity average molecular weight), high-density polyethylenes (from 10,000 to not more than 300,000 in viscosity average molecular weight), and polyethylene waxes (1,000–5,000 in viscosity average molecular weight). Polybutene-1 and polypropylene usable in the present invention are those having a viscosity average molecular weight not more than 4,000,000.

When polybutene-1, polypropylene or a polyethylene having a viscosity-average molecular weight of less than 300,000 is used in an amount exceeding 100 parts by weight based on 100 parts by weight of the high-molecular weight polyethylene having a viscosity average molecular weight of not less than 300,000 used in the present invention, the object of the present invention may not be attained.

According to the present invention, a mixture of the high-molecular weight polyethylene and a plasticizer is melt-extruded and molded into a film, and after removing the plasticizer, the obtained film is stretched to obtain a porous film.

The plasticizer used in the present invention has a good compatibility with the said high-molecular-weight polyethylene, a melting point lower than the melt starting temperature of the said polyethylene and a boiling point higher than the melt starting temperature of the said polyethylene, and is soluble in the polyethylene-insoluble organic solvents. Examples of such plasticizers include higher aliphatic alcohols such as stearyl alcohol and ceryl alcohol, n-alkanes such as n-decane and n-dodecane, paraffin waxes, liquid paraffins, and kerosine.

The weight percentage of the high-molecular weight polyethylene and the plasticizer used as mixture is variable depending on the desired porosity of the molded product. Usually high-molecular weight polyethylene is used in 5–60 parts by weight, preferably 10–50 parts by weight based on 100 parts by weight of the resin composition thereof, and the plasticizer in 95–40 parts by weight, preferably 90–50 parts by weight, based on 100 parts by weight of the resin composition thereof.

In the present invention, various known additives such as antioxidant may be added to the starting composition comprising the said polyethylene and plasticizer in the said ratios and also containing, if necessary, polybutene-1, etc., as mentioned above. These additives are added in an amount of not more than 5% by weight, preferably 0.01–5% by weight, based on the weight of the resin composition.

The said starting composition is kneaded and melt extrusion molded by a single-screw- or twin-screw extruder. A twin-screw extruder is preferred in view of extrusion rate, extrusion stability and kneading power.

The extrusion molding is usually carried out at 140°–240° C. by a known molding method such as T-die molding, inflation molding, etc., to form a film having a thickness of usually 5–500 μm, preferably 10–300 μm.

This film is cooled and then the plasticizer is removed from the film to make the film porous.

As regards the removal of the plasticizer, there can be used, for instance, a known "organic solvent method" in which the plasticizer in the film is dissolved with an organic solvent such as isopropanol, ethanol, hexane or the like, and extracted away by means of solvent substitution.

The film which has been made porous by removal of the plasticizer in the manner described above is suggested to uniaxial or biaxial stretching for the purpose of enhancing its mechanical strength. The stretching can be carried out by using any suitable known stretching means such as roll stretcher, tenter, etc. When the film is subjected to uniaxial stretching, it may be stretched either in the machine direction or in the transverse direction. Biaxial stretching may be carried out either by sequential biaxial stretching or by simultaneous biaxial stretching.

In the said extrusion molding and stretching steps in the above-described production process, mechanical deformations in both machine direction (MD) and transverse direction (TD) are imparted to the said film. The mechanical deformations of the film are imparted as the form of melt deformation at the time of extrusion molding and as the form of solid phase stretch at the time of stretching after plasticizer removal. In the process of the present invention, in imparting these mechanical deformations, the extrusion molding and stretching conditions are controlled by setting the MD/TD overall deformation ratio represented by the following formula to the range of 0.1 to 1:1, preferably 0.2 to 0.8:1.

$$\text{MD/TD overall deformation ratio} = (DR \times \lambda MD)/(WD \times \lambda TD)$$

wherein

DR: draft ratio in extrusion molding;

λMD: stretch ratio in the machine direction (which ratio is supposed to be 1 when the film or sheet is not stretched in the machine direction);

WD: width-direction deformation ratio in extrusion molding (blow ratio in the case of inflation molding);

λTD: stretch ratio in the transverse direction (which ratio is supposed to be 1 when the film or sheet is not stretched in the transverse direction).

When the MD/TD overall deformation ratio is less than 0.1:1 or more than 1:1, the air permeability of the produced film deviates from its proper range, and this film may not satisfy the standard performance for a porous film, particularly for a battery separator.

In the present invention, the draft ratio in extrusion molding is preferably selected from the range of 1–100, the stretch ratio in the machine direction is preferably selected from the range of 1–20, the width-direction deformation ratio in extrusion molding is preferably selected from the range of 1–20, and the stretch ratio in the transverse direction is preferably selected from the range of 1–20, and it is essential that the MD/TD overall deformation ratio calculated from the above formula is within the above-defined range.

The porous film of the present invention produced in the above described manner has a thickness of 5 to 50 μm, preferably 15 to 35 μm. The air permeability of the film as measured according to JIS P-8117 is 200 to 1,000 sec/100 cc, preferably 300 to 1000 sec/100 cc, more preferably 400 to 900 sec/100 cc. In case of use of the porous film of the present invention for a battery separator, if the air permeability of the film is less than 200 sec/100 cc, the resistance becomes low and the desired performance of the battery may not be attained. On the other hand, if the air permeability of the film more than 1,000 sec/100 cc, the resistance becomes high and also the desired performance of the battery may not be obtained. The porosity of the porous film of the present invention is 10 to 50%, preferably 30 to 45%. For determining the porosity, the film was punched out circularly at 5 parts along the width thereof to obtain the 3 cm-diameter circular pieces of film, and the thickness of the central portions of the punched out pieces of film and the weight thereof were measured. The porosity was calculated from the following equation:

$$\text{Porosity } (\%) = (V\rho - W)/(V\rho) \times 100$$

wherein

V: volume of the film (sum of the 5 pieces of film)

W: weight (sum of the 5 pieces of film)

ρ: material density.

If the porosity of the porous film of the present invention is less than 10%, the film may not have a desired level of air permeability, and if the porosity is more than 50%, the surface strength of the film may be deteriorated.

The porous film according to the present invention has excellent mechanical strength, and is especially high in pin puncture strength. The pin puncture strength was measured according to Japanese Agricultural Standard (AS) Notification No. 1,019 (pin diameter: 1 mm; tip: 0.5 R; pin puncturing speed: 300 mm/min. The pin puncture strength of the film of the present invention as determined in the above-described manner is not less than 600 gf/25 μm of film thickness, preferably 600 to 1,000 gf/25 μm of film thickness, more preferably 600 to 800 gf/25 μm of film thickness. If the pin puncture strength of the film is less than 600 gf/25 μm of film thickness, the mechanical strength of film may be low.

As described above, the high-strength porous film according to the present invention has a high surface strength and a moderate degree of air permeability that the conventional films of this type could not have and that could never be realized with the conventional technologies. Thus, the present invention makes it possible to provide a porous film having excellent surface strength while maintaining other qualities at high levels as well, and when, for instance, the film is practically applied as a battery separator, the battery can be assembled at a higher speed in comparison with use of the conventional films.

Such a high-strength porous film can be easily and efficiently produced by the process of the present invention in which most characteristically the MD/TD overall deformation ratio of the film is kept within a specified range throughout the production process.

EXAMPLES

The present invention is explained in more detail in the following Examples and Comparative Examples, but it should be recognized that the scope of the present invention is not restricted to these Examples.

In the following Examples and Comparative Examples, the air permeability of the films was determined according to JIS P8117. The porosity was calculated from the equation: porosity $(\%)=(V\rho-W)/(V\rho)\times 100$ as explained above. The pin puncture strength was measured according to Japanese Agricultural Standard (JAS) Notification No. 1,019.

Example 1

A mixture comprising 25 parts by weight of an ultra-high-molecular-weight polyethylene having a melting point of 135° C. and a viscosity-average molecular weight of 2,000,000 and 75 parts by weight of stearyl alcohol was extruded by a 40 mm φ twin-screw extruder at an extrusion temperature of 170° C. and an extrusion rate of 10 kg/hr and molded into a film by inflation method. In this molding operation, the draft ratio (DR) was 12 and the blow ratio (WD) was 9.

The obtained film was immersed in 60° C. ethanol for 10 minutes to extract away stearyl alcohol. The film was stretched twice the original length in the machine direction (MD) at 120° C. by a roll stretcher and then further stretched 4 times in the transverse direction (TD) at 128° C. by a tentering machine to obtain a porous film with a thickness of 25 μm. The MD/TD overall deformation ratio in this production process is shown in Table 1.

The pin puncture strength, the air permeability and the porosity of the molded product measured by the manners described above are shown in Table 1.

Example 2

A mixture comprising 20 parts by weight of an ultra-high-molecular-weight polyethylene having a melting point of 135° C. and a viscosity-average molecular weight of 2,000,000 and 80 parts by weight of a paraffin wax (average molecular weight=389) was extruded at 170° C. and at a rate of 10 kg/hr by a 40 mm φ twin-screw extruder and inflation molded into a film by the inflation method. In this molding operation, DR=12, WD=6.

The obtained film was immersed in 60° C. hexane for 10 minutes to extract away the paraffin wax. Then the film was stretched 7 times in the transverse direction by a tentering machine to obtain a porous film with a thickness of 26 μm. The MD/TD overall deformation ratio and the properties of the obtained porous film are shown in Table 1.

Example 3

A mixture comprising 25 parts by weight of an ultra-high-molecular-weight polyethylene having a melting point of 135° C. and a viscosity-average molecular weight of 2,000,000 and 75 parts by weight of stearyl alcohol was extruded at 170° C. and at a rate of 10 kg/hr by a 40 mm Φ twin-screw extruder and molded into a film by T-die method. In this molding operation, DR=5 and the deformation rate in the width direction (WD) was 1.

The obtained film was immersed in 60° C. ethanol for 10 minutes to extract away steary alcohol. Then the film was stretched 6 times in the transverse direction at 128° C. by a tentering machine to obtain a porous film with a thickness of 25 μm. The MD/TD overall deformation ratio and the properties of the obtained porous film are shown in Table 1.

Comparative Example 1

The procedure of Example 1 was carried out except that the film was stretched 3 times in the machine direction by a roll stretcher and further stretched 3 times in the transverse direction by a tentering machine to obtain a porous film. The MD/TD overall deformation ratio and the properties of the produced film are shown in Table 1.

Comparative Example 2

The procedure of Example 1 was carried out except that a mixture comprising 20 parts by weight of an ultra-high-molecular-weight polyethylene and 80 parts by weight of stearyl alcohol was extruded and molded by inflation method at a draft ratio of 20 and a blow ratio of 4. After removal of stearyl alcohol by extraction, the molded film was stretched 5 times in the machine direction at 125° C. by a roll stretcher but not stretched in the transverse direction to obtain a porous film with a thickness of 27 μm. The MD/TD overall deformation ratio and the properties of the obtained porous film are as shown in Table 1.

TABLE 1

|  | Example 1 | Example 2 | Example 3 | Comp. Example 1 | Comp. Example 2 |
| --- | --- | --- | --- | --- | --- |
| Draft ratio in extrusion molding | 12 | 12 | 5 | 12 | 20 |
| Width-direction deformation ratio in extrusion molding (Note 1) | 9 | 6 | 1 | 9 | 4 |

TABLE 1-continued

|  | Example 1 | Example 2 | Example 3 | Comp. Example 1 | Comp. Example 2 |
|---|---|---|---|---|---|
| Stretch ratio in machine direction (Note 2) | 2 | 1 | 1 | 3 | 5 |
| Stretch ratio in transverse direction (Note 2) | 4 | 7 | 6 | 3 | 1 |
| MD/TD overall deformation ratio | 0.7 | 0.3 | 0.8 | 1.3 | 25 |
| Film thickness (μm) | 25 | 26 | 25 | 25 | 27 |
| Pin puncture strength (g/25 μm) | 700 | 650 | 620 | 400 | 320 |
| Air permeability (s/100 cc) | 450 | 780 | 500 | 120 | 3500 |
| Porosity (%) | 45 | 42 | 38 | 65 | 35 |

Note 1: In the case of inflation molding, the width-direction deformation ratio corresponds to blow ratio.
Note 2: The MD/TD deformation ratio is calculated by supposing that the stretch ratio in the direction where actually no stretching was made is 1.

As seen from Table 1, it is possible in accordance with the present invention to produce a porous film having a high surface strength as well as a moderate degree of air permeability.

What is claimed is:

1. A high-strength porous film or sheet consisting essentially of a high-molecular-weight polyethylene resin having a viscosity-average molecular weight of not less than 300,000, and having a thickness of 5 to 50 μm, an air permeability of 200 to 1,000 sec/100 cc, a porosity of 10 to 50% and a pin puncture strength of not less than 600 gf/25 μm.

2. A high-strength porous film or sheet according to claim 1, wherein the melting temperature of the high-molecular weight polyethylene resin is 110° to 140° C. and the viscosity-average molecular weight of said resin is 500,000 to 4,000,000.

3. A high-strength porous film or sheet according to claim 2, wherein the viscosity-average molecular weight of the high-molecular-weight polyethylene resin is 1,500,000 to 3,000,000.

4. A high-strength porous film or sheet according to claim 1, wherein the thickness of said porous film or sheet is 15 to 35 μm.

5. A high-strength porous film or sheet according to claim 1, wherein the porosity of said porous film is 30 to 45%.

6. A battery separator comprising a high-strength porous film defined as claim 1.

7. A process for producing a porous film or sheet which comprising melt-extruding and molding a resin composition containing a high-molecular-weight polyethylene resin having a viscosity-average molecular weight of not less than 300,000 and a plasticizer, cooling the extruded film, removing the plasticizer contained in said film, and then stretching the resultant film, said extrusion molding and stretching being carried out in such a way that the machine direction (MD)/transverse direction (TD) overall deformation ratio represented by the following formula is 0.1 to 1:

$$\text{MD/TD overall deformation ratio} = (DR \times \lambda MD)/(WD \times \lambda TD)$$

wherein

DR: draft ratio in extrusion molding;

λMD: stretch ratio in the machine direction (which ratio is supposed to be 1 when the film or sheet is not stretched in the machine direction);

WD: width-direction deformation ratio in extrusion molding (blow ratio in the case of inflation molding);

λTD: stretch ratio in the transverse direction (which ratio is supposed to be 1 when the film or sheet is not stretched in the transverse direction).

8. The process according to claim 7, wherein the melting temperature of the high-molecular-weight polyethylene resin is 110° to 140° C., and the viscosity-average molecular weight of said resin is 500,000 to 4,000,000.

9. The process according to claim 8, wherein the viscosity-average molecular weight of the high-molecular-weight polyethylene resin is 1,500,000 to 3,000,000.

10. The process according to claim 7, wherein the plasticizer is a higher aliphatic alcohol or a paraffin wax.

11. The process according to claim 7, wherein the ratio of the high-molecular-weight polyethylene resin to the plasticizer is 5 to 60 to 95 to 40 by weight based on 100 parts by weight of resin composition.

12. The process according to claim 7, wherein melt extrusion molding is carried out by the inflation method or the T-die method.

13. The process according to claim 7, wherein stretching of the film after removal of the plasticizer is uniaxial tenter stretching in the transverse direction.

14. The process according to claim 7, wherein stretching of the film after removal of the plasticizer is sequential biaxial stretching comprising of roll stretching and tenter stretching.

15. The process according to claim 7, wherein the MD/TD overall deformation ratio is 0.2 to 0.8.

16. A high-strength porous film or sheet consisting essentially of a high-molecular-weight polyethylene resin having a viscosity-average molecular weight of not less than 300,000, and having a thickness of 5 to 50 μm, an air permeability of 200 to 1,000 sec/100 cc, a porosity of 10 to 50% and a pin puncture strength of not less than 600 gf/25 μm, which film or sheet is produced by a process comprising melt-extruding and molding a resin composition containing a high-molecular-weight polyethylene resin having a viscosity-average molecular weight of not less than 300,000 and a plasticizer, cooling the extruded film, removing the plasticizer contained in said film, and then stretching the resultant film, said extrusion molding and stretching being carried out such that the machine direction (MD)/transverse direction (TD) overall deformation ratio represented by the following formula is 0.1 to 1:

$$\text{MD/TD overall deformation ratio} = (DR \times \lambda MD)/(WD \times \lambda TD)$$

wherein

DR=draft ratio in extrusions molding

λMD=stretch ratio in the machine direction which ratio is 1 when the film or sheet is not stretched in the machine direction WD=width-direction deformation ratio in extrusion molding or blow ratio in the case of inflation molding, and λTD=stretch ratio in the transverse direction which ratio is 1 when the film or sheet is not stretched in the transverse direction.

* * * * *